Figure 1:
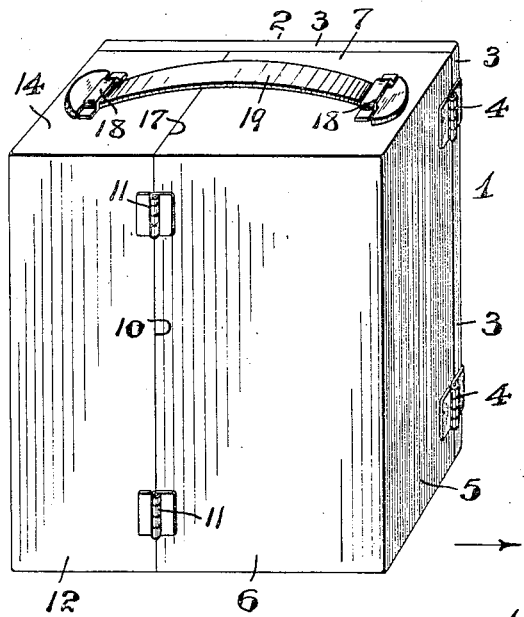

F. MLADINICH.
CAMERA BOX OR CABINET FOR COMBINED MOVING PICTURE CAMERAS AND PROJECTORS.
APPLICATION FILED MAY 1, 1920.

1,397,817.

Patented Nov. 22, 1921.

2 SHEETS—SHEET 1.

INVENTOR:
Frank Mladinich,
BY
Fraentzel and Richards,
ATTORNEYS.

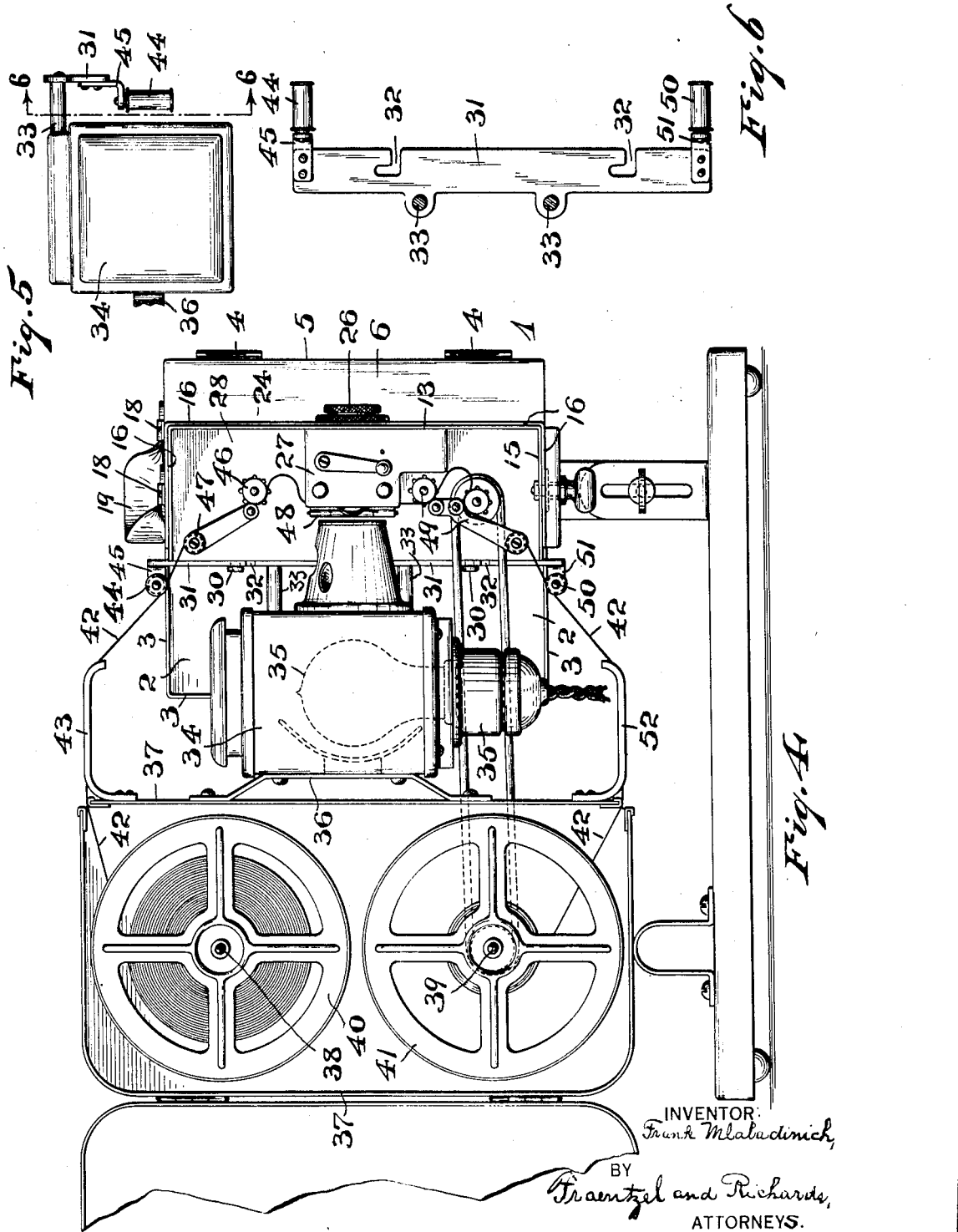

UNITED STATES PATENT OFFICE.

FRANK MLADINICH, OF NEW YORK, N. Y., ASSIGNOR OF FIFTEEN ONE-HUNDREDTHS TO ELMER PONTIN, OF ELIZABETH, NEW JERSEY, AND FORTY-TWO AND ONE-HALF ONE-HUNDREDTHS TO AUGUSTUS R. DE TARTAS, OF ROCKWELL CENTER, LONG ISLAND, NEW YORK.

CAMERA BOX OR CABINET FOR COMBINED MOVING-PICTURE CAMERAS AND PROJECTORS.

1,397,817.   Specification of Letters Patent.   Patented Nov. 22, 1921.

Application filed May 1, 1920. Serial No. 378,203.

*To all whom it may concern:*

Be it known that I, FRANK MLADINICH, a citizen of Servia, residing at New York, in the county of New York and State of New York, have invented certain new and useful Improvements in Camera Boxes or Cabinets for Combined Moving-Picture Cameras and Projectors; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in combined moving picture cameras and projectors; and, the present invention has reference, more particularly, to a novel and simply constructed camera box or cabinet comprising a plurality of hinged or articulating members or parts, which are adapted to interlock in closed relation, to provide a photographic camera, but which are adapted to be brought into an opened relation, so as to permit the use in connection therewith of a moving picture projecting apparatus for throwing or projecting moving pictures upon a screen.

The present invention, therefore, has for its principal object, the production of a novel and simply-constructed camera-box or cabinet, comprising a plurality of hinged or articulating members, usually providing the front and sides of the box, which are readily brought into an interlocking closed relation to provide a moving picture camera suitable to be carried about from place to place for the purpose of photographing pictures, but the articulating members or sections of which can be brought into an open relation, for the attachment to the cabinet of reel-holders, whereby the mechanism may be employed for the projection of moving pictures upon a screen.

The present invention has for its further object to produce in connection with a camera-box or cabinet, comprising a plurality of hinged or articulating members, mechanism adapted for use in taking photographs, and mechanism suitable for the projection of animated pictures.

The invention has for its further object to provide in connection with a camera-box or cabinet of the general character hereinafter more fully set forth, a novel and simply-constructed supporting means for the attachment thereto and the proper arrangement with relation to the opened relation of the articulating box-members or sections, of film-holders or reels of the character usually employed in the projection of moving pictures.

Other objects of the present invention not at this time more particularly enumerated will be clearly understood from the following detailed description of the present invention.

With the various objects of the present invention in view, the said invention consists, primarily, in the novel camera-box or cabinet, comprising a plurality of hinged or articulating box-members or sections adapted to be brought into a closed interlocked relation, or into an open relation, as occasion may warrant, and as hereinafter more fully set forth; and, the invention consists, furthermore, in the novel arrangements and combinations of the various devices and parts, as well as in the details of the construction of the said parts, all of which will be more fully described in the following specification, and then finally embodied in the clauses of the claim which are appended to and which form an essential part of the said specification.

The invention is clearly illustrated in the accompanying drawings, in which:—

Figure 2:
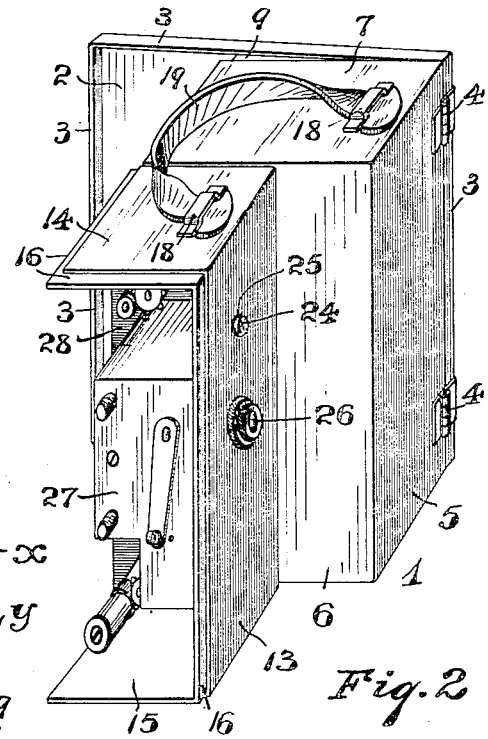
Figure 3:
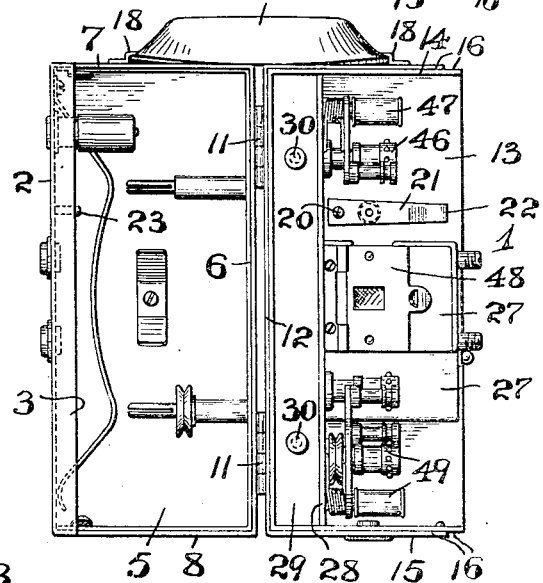

Figure 1 is a perspective view of a combined camera and projector inclosed in a camera box or cabinet comprising a plurality of hinged or articulating box-members or sections, in their closed relation, said view showing one embodiment of the principles of the present invention; Fig. 2 is a perspective view of the same, with the hinged or articulating box-members or sections shown in an open relation; and Fig. 3 is an elevation of the same, looking in the direction of the arrow X in said Fig. 2.

Fig. 4 is an elevation of the device, looking in the direction of the arrow Y, in said Fig. 2, showing the opened-up box or cabinet adjusted for use as a projecting machine; Fig. 5 is a detail view, showing in plan, the top of the lamp-housing of the projecting mechanism, and an attaching element connected with said housing for supporting the projecting mechanism in its operative position with the opened box-members or sections of the cabinet; and Fig. 6 is a cross-sectional representation, taken on line 6—6 in said Fig. 5, looking in the direction of the arrows in said figure.

Similar characters of reference are employed in the said above described views, to indicate corresponding parts.

Referring now to the several figures of the drawings, the reference-character 1 in Figs. 1 and 2 indicates a complete camera-box or cabinet embodying the principles of the present invention, the same comprising, a main front member 2, surrounded by a marginal flange 3, to one portion of which is movably attached by means of hinges 4, or in any other suitable manner, a box-member comprising rigidly connected side-sections 5 and 6, and a top-section 7 and bottom-section 8, the said sections 7 and 8 being provided with off-set portions 9, one of which is shown in Fig. 2 of the drawings, which are adapted to enter into interlocking relation with portions of the said marginal flange 3. Movably connected with the marginal portion 10 of the side-section 6 by means of hinges 11, or in any other suitable manner, is another box-member comprising rigidly connected side-sections 12 and 13, and a top-section 14 and bottom-section 15, the several sections being formed with a marginal off-set portion providing a flange 16, portions of which are adapted to enter into interlocking relation beneath the marginal edge-portions 17 of the top-section 7 and bottom-section 8, and other portions of said flange 16 being adapted to enter into interlocking relation with portions of the marginal flange 3, all of which will be clearly understood from an inspection of the several figures of the drawings. The top-sections 7 and 14 are respectively provided with handle-loops, as 18, or other suitable means, for the attachment to said sections of a handle 19 of any suitable construction. As shown in Fig. 3 of the drawings, secured upon the inner surface of the side-section 13, by means of a screw 20, or other suitable fastening means, is a spring-catch 21, provided with a catch or holding-portion 22 adapted to be sprung into retaining engagement with a lock-stud or post 23 connected with the face-plate or front member 2, when the various sections of the box or cabinet are brought into closed relation.

To release the holding portion 22 of the spring-catch 21 from said stud or post 23, the said spring-catch 21 is provided with a push-button 24 extending into and through a correspondingly located hole or perforation 25 in the side-section 13.

In connection with the said camera-box or cabinet herein-above described, I have shown projecting from the said side-section 13, a lens 26 of any suitable type, which is used for taking a photograph and also for projecting a photograph, which is provided with any usual focusing device and diaphragm, not shown, however, in the accompanying drawings. Suitably mounted with the box-member, comprising the sections 12, 13, 14 and 15, and in communication with the said lens devices, is a suitably constructed frame-work or housing, as 27, in which is disposed a shutter-mechanism of any suitable construction. Suitably mounted between the top-section 14 and the bottom-section 15, and directly back of the said housing 27 is a plate 28, said plate having extending rearwardly therefrom, along its exposed marginal edge-portion, a member or element, as 29, which carries a number, (in this instance two) of headed attaching members or buttons 30. These members or buttons 30 are for the purpose of receiving and mounting thereon a carrier-plate or bar 31 which is provided with an arrangement of bayonet-slots 32, see Fig. 6 of the drawings, which permits the said plate or bar 31 to be readily slipped into suspending relation with the shank of the said members or buttons 30, back of the enlarged or headed portions thereof, and whereby accidental displacement of the said plate or bar 31 is prevented, as will be clearly evident. Connected with and extending at right angles from the said plate or bar 31 are conveniently located carrier-rods or members, as 33, to which is secured, in any suitable manner, a lamp-housing 34 carrying in connection therewith, as indicated in Fig. 4 of the drawings, a lamp 35. Secured to the said housing 34 by means of a bracket 36, or in any other suitable manner, is a usual reel-carrying shell or frame, as 37, provided with the usual spindles 38 and 39, upon which are rotatably disposed the film-reel 40 and the take-up reel 41, substantially as represented in said Fig. 4 of the drawings.

When the device is arranged as shown in Figs. 1, 2 and 3 of the drawings, it is adapted for operation as a photographic camera; but, when arranged in the manner represented in Fig. 4 of the drawings, it is adapted, especially, as a moving picture projector for either amateur or professional use. In that case, the picture-film 42 is passed from the reel 40 over a guide-plate or element 43, and beneath a guide-roll 44 mounted upon a bracket 45 at or near one end of the previously-mentioned mounting plate or bar 31, and thence between the film-sprocket 46 and tension device 47 into the previously-mentioned housing 27 and the usual film-keeper 48 of the same. The said film, as shown, thence passes from said housing 27 and the film-keeper 48, between the usual step by step feeding mechanism, generally indicated by the reference-characters 49, over a guide-roll 50 mounted upon a bracket 51 at or near the other end of said mounting plate or bar 31, and thence over the usual guide-plate or member 52, upon the take-up reel 41 hereinabove mentioned.

From the foregoing description and from an inspection of the several figures of the drawings, it will be readily seen, that a simply constructed, as well as an easily operated sectional camera-box or cabinet, the movable sections of which are adapted to be swung about to adapt the device for use as a moving picture projector, is provided, and the sections when closed interlocking at their meeting edges in a manner that the device is perfectly light-proof, so as to be adapted for use as a camera, and in addition providing a box or casing for conveniently carrying the same about, or for transportation from place to place.

I am fully aware that changes may be made in the general arrangements and combinations of the various devices and parts, as well as in the details of the construction of the said parts, without departing from the scope of the present invention as set forth in the foregoing specification, and as defined in the clauses of the claim which are appended to the said specification. Hence, I do not limit my present invention to the exact arrangements and combinations of the various devices and parts as described in the said specification, nor do I confine myself to the exact details of the construction of the said parts as illustrated in the accompanying drawings.

I claim:—

1. A camera box or cabinet for a combined moving picture camera and projector, comprising a main-member, a box-shaped member hinged at one edge to said main member, and a second box-shaped member hinged at one edge to said first-mentioned box-shaped member.

2. A camera box or cabinet for a combined moving picture camera and projector, comprising a main member having a right-angled marginal flange surrounding said main member, a box-shaped member hinged at one edge to said main member, and a second box-shaped member hinged at one edge of said first-mentioned box-shaped member, said box-shaped members having marginal flanges adapted to be brought into interlocked relation with the marginal flange of said main member.

3. A camera box or cabinet for a combined moving picture camera and projector, comprising a main member, and a plurality of box-shaped members movable with relation to each other and to said main member, one of said box-shaped members being provided with a lens and a housing containing a shutter-mechanism, and also a film-strip feeding mechanism, and an attaching means connected with and extending from said box-shaped member for detachably mounting thereon a reel-carrying frame, when the said box-shaped members are brought into opened relation.

4. A camera box or cabinet for a combined moving picture camera and projector, comprising a main member, and a plurality of box-shaped members movable with relation to each other and to said main member, one of said box-shaped members being provided with a lens and a housing containing a shutter-mechanism, and also a film-strip feeding mechanism, and an attaching means connected with and extending from said box-shaped member for detachably mounting thereon a reel-carrying frame, when the said box-shaped members are brought into opened relation, said main member and said box-shaped members being provided with marginal flanges adapted to be brought into interlocked relation when the reel-carrying frame is removed and the said box-shaped members and said main member are brought into closed relation.

5. A camera box or cabinet for a combined moving picture camera and projector, comprising a main member, a box-shaped member hinged at one edge to said main member, and a second box-shaped member hinged at one edge to said first-mentioned box-shaped member, said first-mentioned box-shaped member being provided with a lens and a housing containing a shutter-mechanism, and also a film-strip feeding mechanism, and an attaching means connected with and extending from said first-mentioned box-shaped member for detachably mounting a reel-carrying frame, when the said box-shaped members are brought into opened relation.

6. A camera box or cabinet for a combined moving picture camera and projector, comprising a main member, a box-shaped member hinged at one edge to said main member, and a second box-shaped member hinged at one edge to said first-mentioned box-shaped member, said first-mentioned box-shaped member being provided with a lens and a housing containing a shutter-mechanism, and also a film-strip feeding mechanism, and an attaching means connected with and extending from said first-mentioned box-shaped member for detachably mounting a reel-carrying frame, when the said box-shaped members are brought into opened relation, said main member and said box-shaped members being provided with marginal flanges adapted to be brought into interlocked relation when the reel-carrying frame is removed and the said box-shaped members and said main member are brought into closed relation.

7. In a camera-box or cabinet for a combined moving picture camera and projector, a plate mounted within said camera-box or cabinet, attaching buttons connected with and extending from said plate, a bar provided with bayonet-slots for detachably mounting the same upon said buttons, carrier-rods extending from said bar, a lamp-housing carried by said rods, and a reel-carrying frame secured to said lamp-housing.

8. In a camera-box or cabinet for a combined moving picture camera and projector, a plate mounted within said camera-box or cabinet, attaching buttons connected with and extending from said plate, a bar provided with bayonet-slots for detachably mounting the same upon said buttons, carrier rods extending from said bar, a lamp-housing carried by said rods, a reel-carrying frame secured to said lamp-housing, and film-feed guides connected with said bar.

In testimony that I claim the invention set forth above I have hereunto set my hand this 29th day of April, 1920.

FRANK MLADINICH.

Witnesses:
FRED'K C. FRAENTZEL,
ELMER PONTIN.